UNITED STATES PATENT OFFICE.

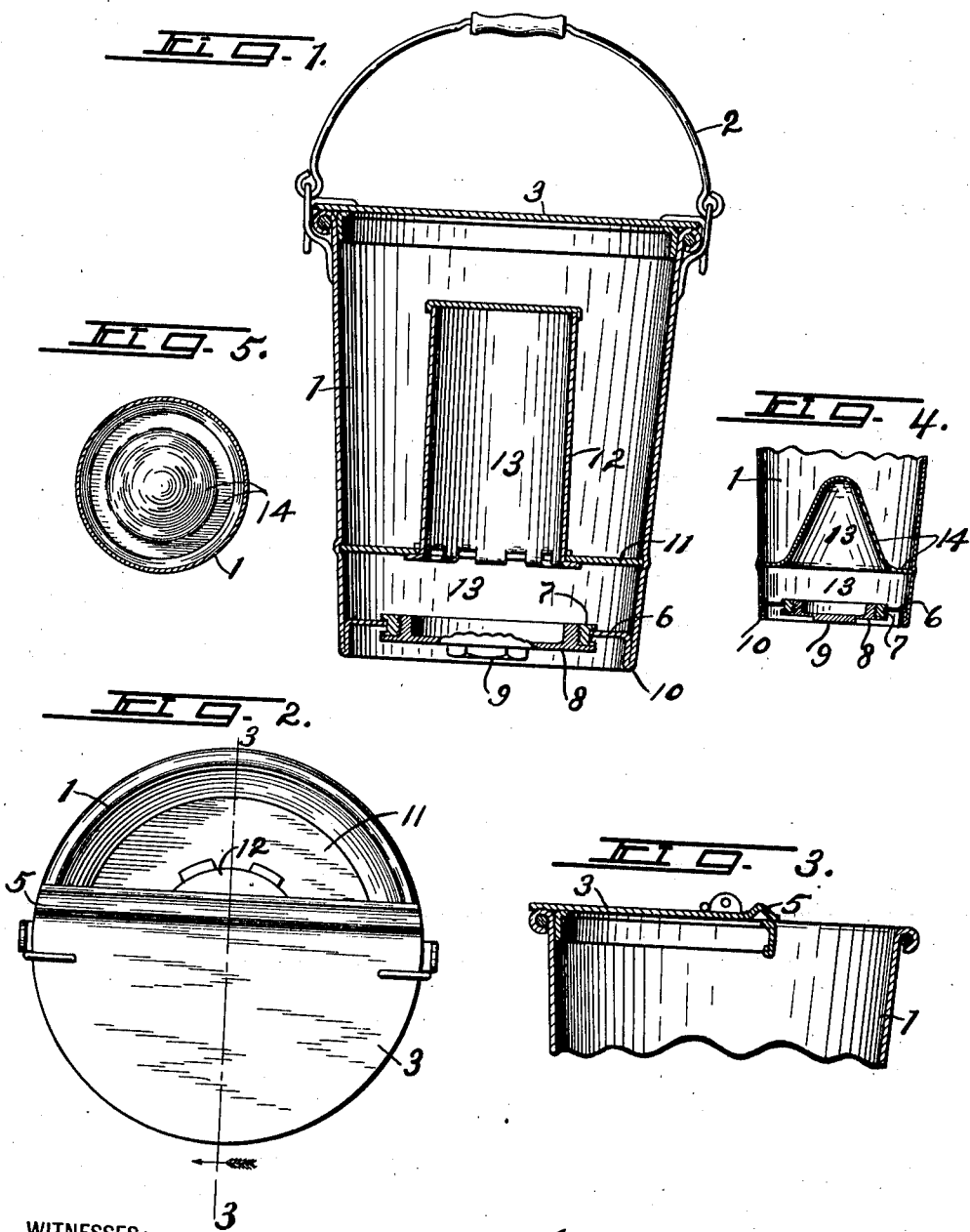

SIDNEY W. MOORE, OF STOCKBRIDGE, NEW YORK.

MILK-PAIL.

1,048,851.

Specification of Letters Patent. Patented Dec. 31, 1912.

Application filed February 19, 1912. Serial No. 678,532.

*To all whom it may concern:*

Be it known that I, SIDNEY W. MOORE, of Stockbridge, in the county of Madison, in the State of New York, have invented new and useful Improvements in Milk-Pails, of which the following, taken in connection with the accompanying drawings, is a full, clear, and exact description.

This invention relates to pails used for milking and has for its object the several purposes which will hereinafter fully appear.

It is a well known fact that when the milk is taken from the cow and allowed to stand any appreciable length of time without cooling, that the bacteria forms very rapidly, so much so that milk taken in an ordinary pail, even though the time consumed in milking is not more than ten or twelve minutes, and then transferred to cans, that the bacteria will form at the rate of from 150,000 to 200,000 per cubic centimeter during such time. That milk containing such a percentage of bacteria should be avoided, and it is the purpose of this invention to produce milk to reduce such percentage to the negligible point.

By actual experience and as the result of scientific tests, I have found that by allowing the milk to flow from the cow into the ordinary pail, which time of milking consumes about ten or twelve minutes, and then pouring it into a can which is cooled by being immersed in a tank of ice water, that the bacteria will form to the extent of from 4,000 to 20,000 per cubic centimeter. I have, however, discovered by experience and by having the milk scientifically tested, that by using a pail in which provision has been made for holding ice or a cooling compound, so that the milk will strike a chilled surface as it comes from the udder, I am able to accomplish two things; first, homogenizing the milk to a more or less extent, which distributes the fat globules so as to make the milk more uniform, by bringing it in contact with or impinging it against a chamber containing ice or chilling compound, and, second, instantly cooling it by forcing it against the cooled chamber and reducing it to practically a non-bacteria-producing temperature after it leaves the udder.

I am aware that milk cans, that is cans used for receiving, storing and transporting the milk, have been employed in which there is an interior cooling chamber, but my invention has nothing to do with a receptacle of that character but relates to the pail used in milking, for the reason that I have found that by using an ordinary pail and transporting the same to the can, the damage, by way of the formation of bacteria, has been accomplished, while if the milking pail itself is provided with means for cooling the milk as it comes from the udder, and its temperature is reduced to the point where bacteria will not form, and by actual tests I have found that by the use of such an apparatus the percentage of bacteria has been reduced to less than one thousand per cubic centimeter.

For the purposes of accomplishing the foregoing results, my invention consists in a milking pail constructed substantially as herein described, and set forth in the clauses of claim hereunto annexed.

It is constructed as follows, reference being had to the accompanying drawings, in which—

Figure 1 shows a vertical section of a pail embodying one form of cooling chamber. Fig. 2 is a top plan view thereof showing part of the cover. Fig. 3 is a cross section of the top showing a part of the lid. Fig. 4 is a vertical section showing a modified form of the cooling receptacle. Fig. 5 is a top plan view.

—1— is a pail or receptacle constructed preferably circular in cross section and having the usual bail —2— and a divided cover —3—, one part of which not shown may be raised or removed during the milking, and —5— is a bead or obstruction placed adjacent to the edge so as to keep any dirt or water from sliding or flowing into the pail. Any suitable means for retaining the cover upon the top of the pail may be provided.

One embodiment of the invention is best shown in Fig. 1, in which the bottom —6— has a large central recess as shown, which is provided with a threaded annular ring —7—, and —8— is a screw threaded cap adapted to engage with said annular ring so as to form a water-tight joint, and —9— is a thumb piece for operating the screw threaded cap —8—. The bottom of the pail is also provided with an annular flange extending around the bottom to a point which will be in line with the thumb piece —9— so as to cause the pail to always maintain a level position. Within the pail I form an annular inwardly extending flange —11— and extending upwardly from this flange is a chamber —12—, preferably cylindrical in form, thereby forming a recess —13— in the lower portion of the pail and extending upwardly as shown. In Fig. 4 I show the same construction, except that the flange and chamber are formed all in one piece, as shown. This may be readily done by the process well known to those skilled in the art of stamping metals.

In actual practice, when I desire to use the pail, I first invert it and fill the recess —13— with ice and some salt, or it may be filled with a cooling compound, so that when the pail is in use the milk will strike directly against the chamber —12— and instantaneously cool it.

As stated above, I have found, by actual tests, that milk which has been recovered by this apparatus, the number of bacteria per cubic centimeter was less than one thousand, and it will therefore be seen that by the use of a milking pail as above described, any person will be able to produce milk containing little or no bacteria at a minimum expense.

Having described my invention, what I claim is:—

1. The herein described milking pail, comprising a central chamber having an upper face constructed of a single piece of metal, stamped to the desired form, and watertight, a lower base having an opening therein, a collar for said opening and means for closing the opening in the collar.

2. A milk pail comprising a central upright chamber in connection with a lower horizontal chamber, an opening in the base of the horizontal chamber, a ring in said opening and means for closing the opening through the ring.

3. A milk pail having the lower edge of its circumferential wall provided with a return bend, the end portion again bent backwardly and extending at substantially right angles to the side wall to form a bottom having an opening therein, a horizontal plate attached to the side walls somewhat above the base and having an opening therein, an upright hollow cylinder, having its upper end closed, attached thereto at its lower end, and means for closing the opening in the base.

4. A milk pail comprising side walls and a base, an opening in the base and means for closing said opening, a horizontal partition having an opening therein and a hollow water-tight cylinder having an open end, said open end registering with the opening in the partition and in water-tight connection therewith.

5. A pail comprising side walls and a base, an opening in said base and means for closing said opening, a horizontal partition having an opening therein and a hollow water-tight member having an open end, the edge along said open end having forwardly extending slits therein, and bent backwardly to form two parallel flanges, the inner portion of said partition adapted to fit between the parallel rows of flanges, and means for closing the opening in the base.

6. A pail having an opening in its base, a partition parallel to said base and an opening therein, a sheet metal member having its lower end provided with two rows of laterally extending flanges, the inner edge of the partition adapted to fit between said rows of flanges, and means for closing the opening in the base.

7. A pail comprising a base, having an opening therein, a sheet metal member having an opening adapted to register with said opening and provided with two parallel rows of flanges, the edge around the opening in the base adapted to fit between said rows of flanges.

In witness whereof I have hereunto set my hand this 14th day of February, 1912.

SIDNEY W. MOORE.

Witnesses:
E. A. THOMPSON,
H. E. CHASE.